(12) United States Patent
Staniewicz et al.

(10) Patent No.: US 8,576,033 B2
(45) Date of Patent: Nov. 5, 2013

(54) ELECTROMAGNET AND ELECTROMAGNETIC COIL ASSEMBLY

(75) Inventors: Zbyslaw Staniewicz, Barrie (CA); Christiaan Vander Ploeg, Aurora (CA); Gary J. Spicer, Mississauga (CA)

(73) Assignee: Litens Automotive Partnership, Woodbridge (CA)

(\*) Notice: Subject to any disclaimer, the term of this patent is extended or adjusted under 35 U.S.C. 154(b) by 0 days.

(21) Appl. No.: 13/389,163

(22) PCT Filed: Aug. 11, 2010

(86) PCT No.: PCT/CA2010/001246
§ 371 (c)(1),
(2), (4) Date: Feb. 6, 2012

(87) PCT Pub. No.: WO2011/017811
PCT Pub. Date: Feb. 17, 2011

(65) Prior Publication Data
US 2012/0133465 A1    May 31, 2012

Related U.S. Application Data

(60) Provisional application No. 61/232,872, filed on Aug. 11, 2009.

(51) Int. Cl.
*H01F 7/08* (2006.01)

(52) U.S. Cl.
USPC .......................................... 335/220; 335/296

(58) Field of Classification Search
USPC ................................ 335/220–229, 251, 296
See application file for complete search history.

(56) References Cited

U.S. PATENT DOCUMENTS

| | | | |
|---|---|---|---|
| 2,808,917 A | 10/1957 | Harter | |
| 3,189,150 A | 6/1965 | Chapman | |
| 3,993,972 A * | 11/1976 | Barbrook | 335/220 |
| 5,320,206 A | 6/1994 | Maejima | |
| 6,091,590 A | 7/2000 | Sakamoto | |

(Continued)

FOREIGN PATENT DOCUMENTS

WO    WO-2010001753 A1    1/2010

OTHER PUBLICATIONS

International Search Report and Written Opinion of the ISA, ISA,CA, Gatineau, Quebec, CA, mailed Nov. 30, 2010.

(Continued)

*Primary Examiner* — Bernard Rojas
(74) *Attorney, Agent, or Firm* — Harness, Dickey & Pierce, P.L.C.

(57) ABSTRACT

An electromagnet may comprise a pole piece and a coil assembly. The pole piece may be monolithically formed of a magnetically susceptible material and have a channel structure and a first flange member. The channel structure may have an annular inner side wall, an annular outer side wall and an annular end wall that fixedly couples the inner and outer side walls to one another on a first axial end of the pole piece. The channel structure may be open on a second axial end of the pole piece that is opposite the first axial end. The first flange member may be coupled to an end of one of the inner and outer side walls on the second axial end and extend radially from the channel structure. The coil assembly may be fixedly coupled to the channel structure between the inner and outer side walls.

20 Claims, 8 Drawing Sheets

(56) References Cited

U.S. PATENT DOCUMENTS

| | | | |
|---|---|---|---|
| 6,138,809 A | 10/2000 | Kinoshita et al. | |
| 6,371,270 B1 * | 4/2002 | Matsumoto | 192/84.961 |
| 7,090,063 B2 | 8/2006 | Imai et al. | |
| 7,247,118 B2 * | 7/2007 | Haruki et al. | 475/231 |
| 2002/0170795 A1 * | 11/2002 | Yasui et al. | 192/35 |
| 2008/0042791 A1 * | 2/2008 | York et al. | 335/296 |
| 2010/0122882 A1 | 5/2010 | Komorowski et al. | |

OTHER PUBLICATIONS

International Preliminary Report on Patentability, IPEA/CA, Gatineau, Quebec, CA, mailed Nov. 25, 2011.

* cited by examiner

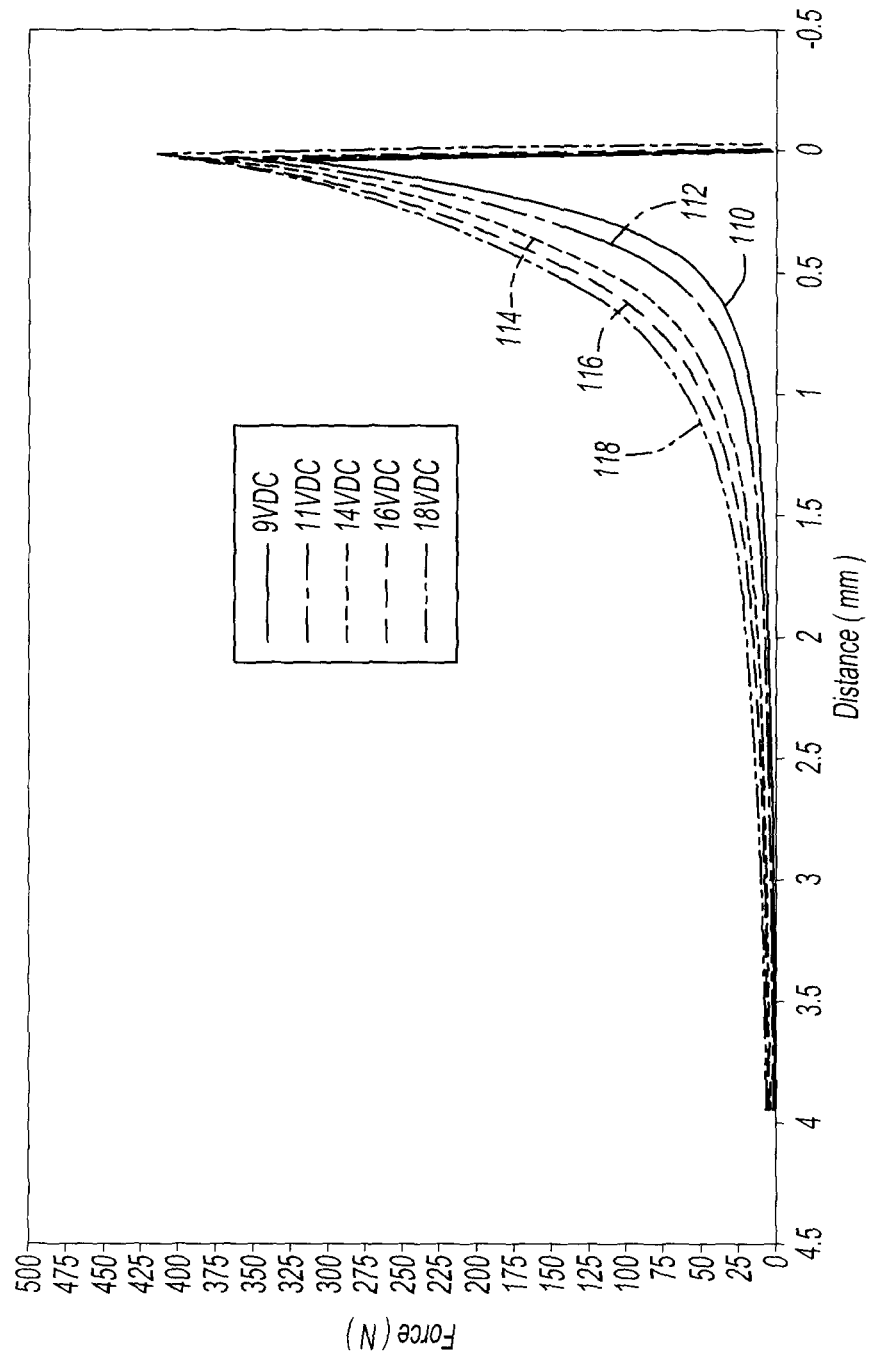

ELECTROMAGNET AND ELECTROMAGNETIC COIL ASSEMBLY

CROSS-REFERENCE TO RELATED APPLICATION

This application is a 371 U.S. National Stage of International Application No. PCT/CA2010/01246, filed Aug. 11, 2010. This application claims the benefit of U.S. Provisional Patent Application No. 61/232,872 filed Aug. 11, 2009. The disclosures of the above-referenced applications are incorporated by reference as if fully set forth in detail herein.

INTRODUCTION

The present disclosure generally relates to an electromagnet and electromagnetic coil assembly, and more specifically, to an electromagnetic coil assembly that may be used to selectively couple and decouple an element to a rotating shaft.

SUMMARY

This section provides a general summary of the disclosure, and is not a comprehensive disclosure of its full scope or all of its features.

In one form, the present teachings provide an electromagnet comprising a pole piece and a coil assembly. The pole piece may be monolithically formed of a magnetically susceptible material and have a channel structure and a first flange member. The channel structure may have an annular inner side wall, an annular outer side wall and an annular end wall that fixedly couples the inner and outer side walls to one another on a first axial end of the pole piece. The channel structure may be open on a second axial end of the pole piece that is opposite the first axial end. The first flange member may be coupled to an end of one of the inner and outer side walls on the second axial end and extend radially from the channel structure. The coil assembly may be fixedly coupled to the channel structure between the inner and outer side walls.

The present teachings further provide an electromagnetic coil assembly comprising a pole piece, a coil assembly and an armature plate. The pole piece may be monolithically formed of a magnetically susceptible material and have a channel structure and a first flange member. The channel structure may have an annular inner side wall, an annular outer side wall and an annular end wall that fixedly couples the inner and outer side walls to one another on a first axial end of the pole piece. The channel structure may be open on a second axial end of the pole piece that is opposite the first axial end. The first flange member may be coupled to an end of one of the inner and outer side walls on the second axial end and extend radially from the channel structure. The first flange member may also define a first contact surface. The coil assembly may be fixedly coupled to the channel structure between the inner and outer side walls. The armature plate may define a second contact surface. The first contact surface may be in contact with the second contact surface in a first configuration when the coil assembly is energized so as to inhibit relative motion between the pole piece and armature plate. The first contact surface may be separated from the second contact surface by a gap in a second configuration when the coil assembly is de-energized so as to allow relative motion between the pole piece and armature plate. In the first configuration, the armature plate, pole plate and coil assembly may define an empty cavity.

The present teachings further provide an electromagnetic coil assembly comprising a pole piece, a coil assembly and an armature plate. The pole piece may be monolithically formed of a magnetically susceptible material and have a channel structure and a first flange member. The channel structure may have an annular inner side wall, an annular outer side wall and an annular end wall that fixedly couples the inner and outer side walls to one another on a first axial end of the pole piece. The channel structure may be open on a second axial end of the pole piece that is opposite the first axial end. The first flange member may be coupled to the inner side wall on the second axial end and the second flange member may be coupled to the outer side wall on the second axial end. The first flange member may extend radially from the channel structure. The coil assembly may be fixedly coupled to the channel structure between the inner and outer side walls and define a first contact surface. The armature plate may define a second contact surface. The second contact surface may be in contact with the first contact surface in a first configuration when the coil assembly is energized so as to inhibit relative motion between the pole piece and armature plate. The second contact surface may be separated from the first contact surface by a gap in a second configuration when the coil assembly is de-energized so as to allow relative motion between the pole piece and armature plate.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 16 is a graph illustrating the attractive force at a number of operating voltages between a pole piece and armature plate on the y-axis versus separating distance between the pole piece and armature plate on the x-axis for the electromagnetic coil assembly of FIG. 10.

Corresponding reference numerals indicate corresponding parts throughout the several views of the drawings.

DETAILED DESCRIPTION OF THE VARIOUS EMBODIMENTS

Figure 1:
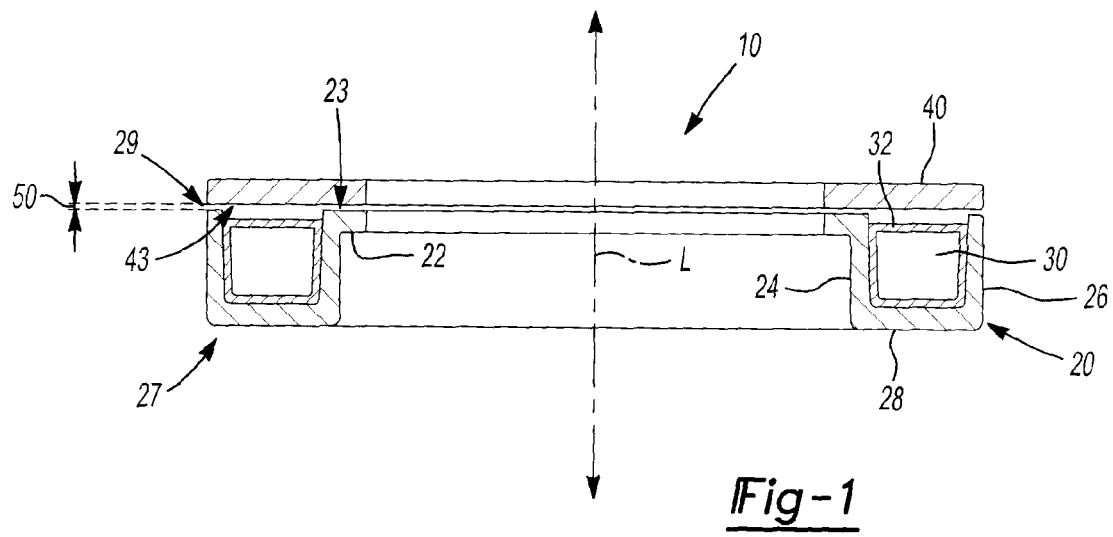
FIG. 1 is a sectional view of an exemplary electromagnetic coil assembly constructed in accordance with the teachings of the present disclosure.
Figure 2:
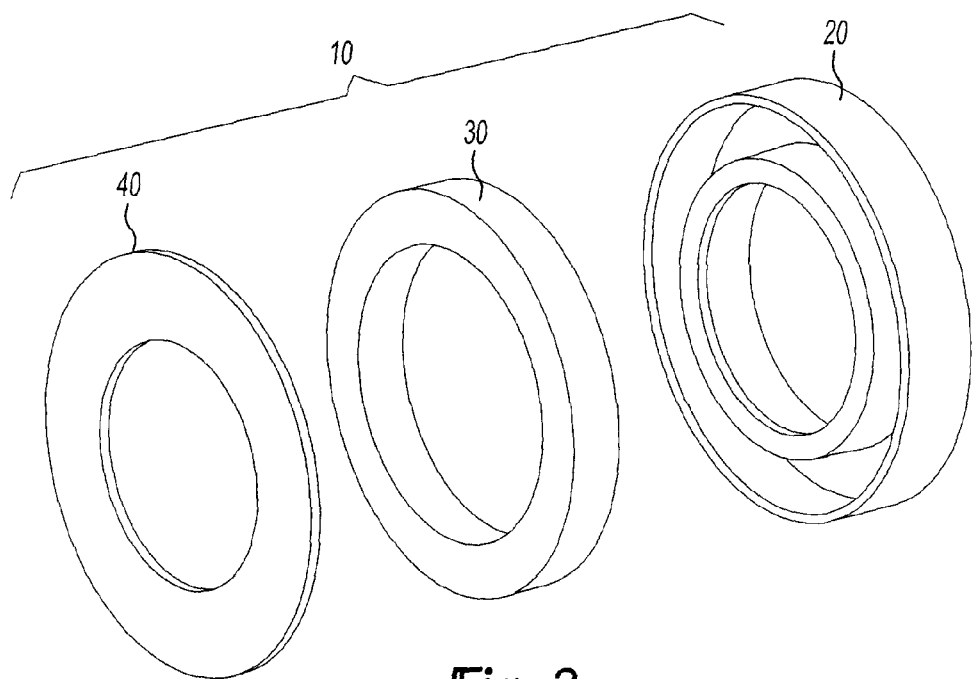
FIG. 2 is a partially exploded view of an exemplary electromagnetic coil assembly constructed in accordance with the teachings of the present disclosure.

With reference to FIG. 1 of the drawings, an exemplary electromagnetic coil assembly according to various embodiments of the present disclosure is generally indicated by reference numeral 10. The electromagnetic coil assembly 10 may include a pole piece 20, a coil assembly 30 and an armature plate 40. The electromagnetic coil assemblies 10 described herein may be utilized in a clutch assembly to selectively couple and decouple an accessory with a rotating shaft, such as those described in U.S. patent application Ser. No. 12/620,023, the disclosure of which is herein incorporated in its entirety. Such accessories include, but are not limited to, an engine water pump, an engine vacuum pump, a vehicle air conditioning pump and a power steering pump. In a non-limiting example, the armature plate 40 may be a component of an accessory that is powered by coupling the armature plate 40 with a rotating shaft in a powered configuration. In an unpowered configuration, the armature plate 40 may be coupled with a non-rotating pole piece 20 such that the armature plate 40 does not rotate with the rotating shaft and, thus, the associated accessory is not powered.

Figure 3:
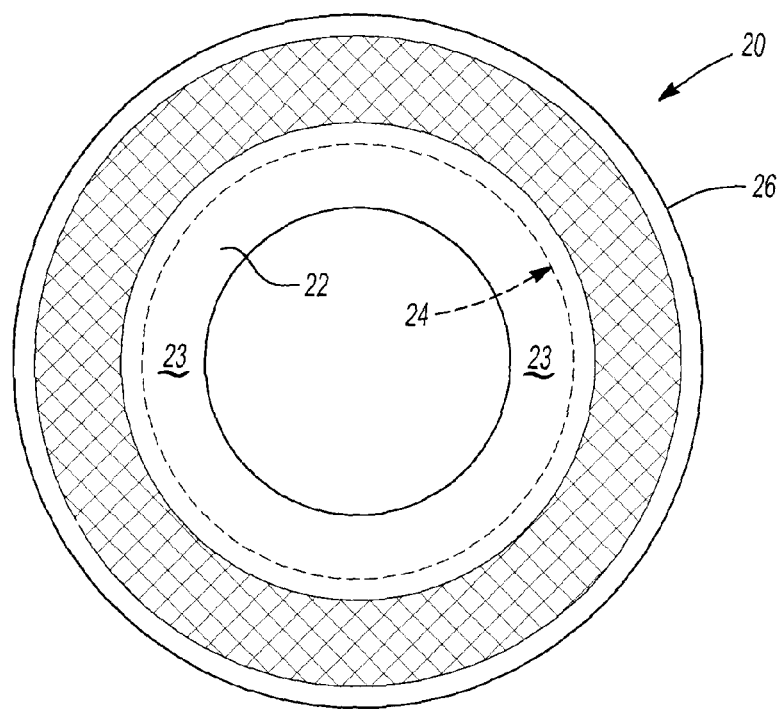
FIG. 3 is a perspective view of a pole piece of an exemplary electromagnetic coil assembly constructed in accordance with the teachings of the present disclosure.
Figure 4:
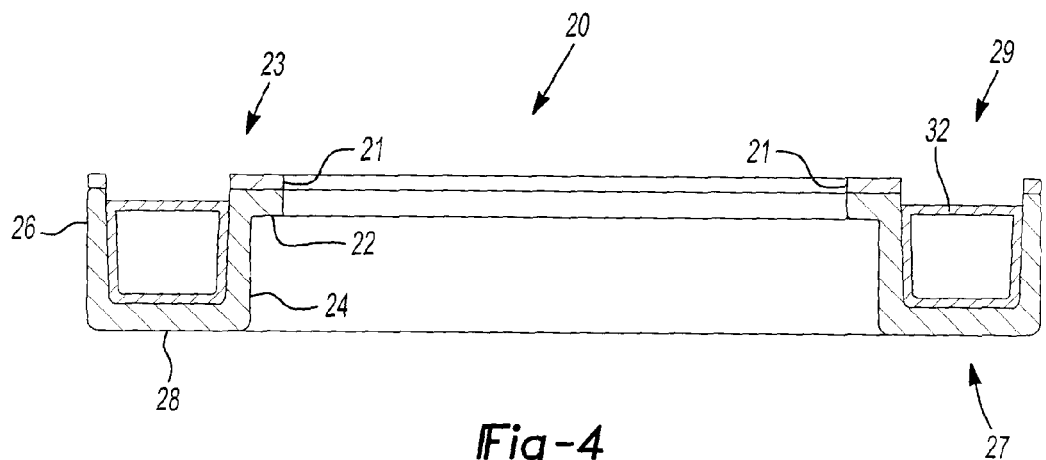
FIG. 4 is a sectional view of an exemplary electromagnetic coil assembly constructed in accordance with the teachings of the present disclosure.
Figure 5:
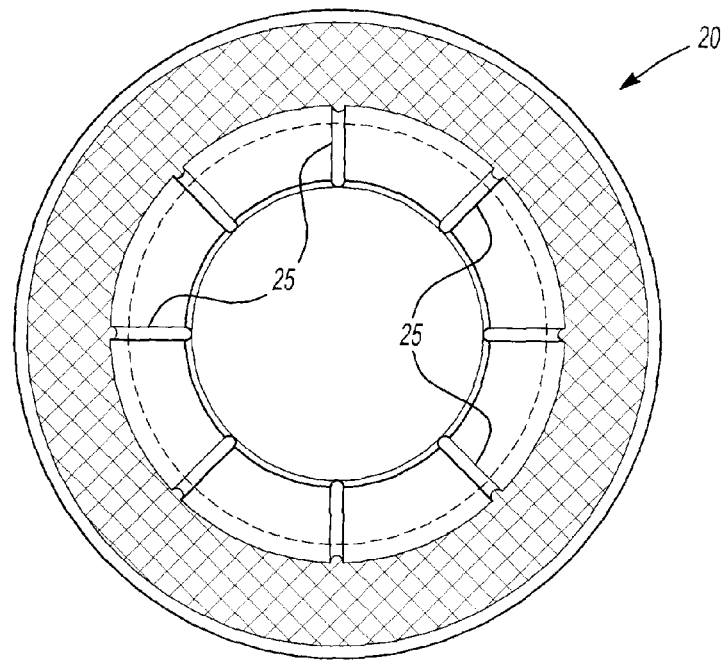
FIG. 5 is a perspective view of a pole piece of an exemplary electromagnetic coil assembly constructed in accordance with the teachings of the present disclosure.

The pole piece 20 may be made of a magnetically susceptible material such that the pole piece 20 can control the distribution of magnetic flux generated by the coil assembly 30. With additional reference to FIG. 3, the pole piece 20 can have a channel structure including an annular inner side wall 24, an annular outer side wall 26 and an annular end wall 28 that couples the inner and outer side walls 24, 26 to each other. The annular end wall 28 can be located on one axial end 27 of the pole piece 20. On a second axial end 29 opposite the first axial end 27, the channel structure may be open. Additionally, the pole piece 20 may be monolithically formed or, alternatively, formed from a plurality of individual pieces that are coupled together.

Figure 6:
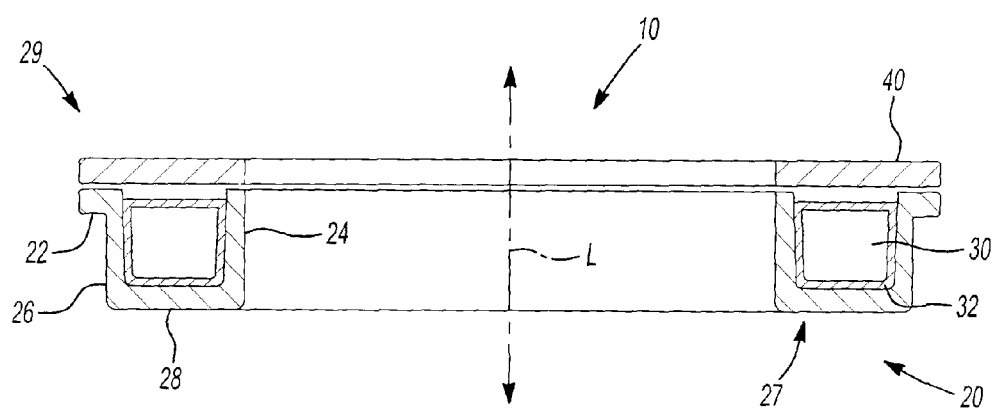
FIG. 6 is a sectional view of an exemplary electromagnetic coil assembly constructed in accordance with the teachings of the present disclosure.
Figure 7:
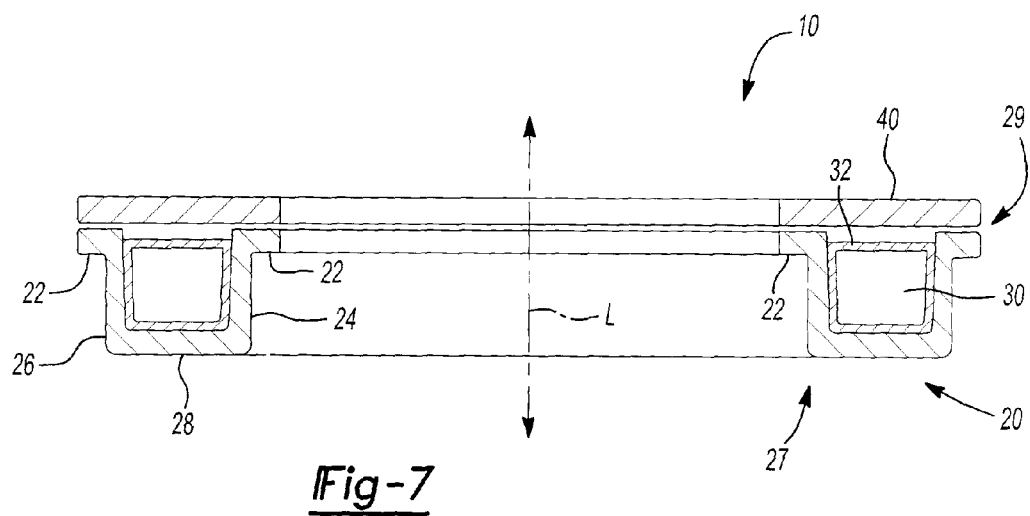
FIG. 7 is a sectional view of an exemplary electromagnetic coil assembly constructed in accordance with the teachings of the present disclosure.

A flange member 22 can be coupled to the inner side wall 24 (FIGS. 1-5) or outer side wall 26 (FIG. 6) on the second axial end 29. According to various additional embodiments, a flange member 22 can be coupled to each of the inner side wall 24 and outer side wall 26 on the second axial end 29 (FIGS. 7-14). While each of the Figures illustrates one of three configurations, i.e., inner flange, outer flange and both inner and outer flange, it is understood that each of the exemplary embodiments may be modified to include a different flange configuration without departing from the scope of the present disclosure. The flange member 22 can extend radially from the channel structure, i.e., in the direction of the radius of the pole piece 20. Further, the flange member 22 may define a flange surface or contact surface 23. As described more fully below, the flange or contact surface 23 can be a relatively flat surface that may be used to contact and frictionally engage the armature plate 40. Further, the flange or contact surface 23 may be perpendicular to the centerline L of the channel structure of the pole piece 20. For example only, flange or contact surface 23 may be flat within 0.25 millimeters and have a runout relative to centerline L within 0.25 millimeters. In some embodiments, the flange member 22 can have a stepped design (FIG. 9) in which the flange surface 23 includes a first portion 22A and a second portion 22B offset from the first portion 22A.

One or more finishing processes may be utilized to ensure that the contact surface 23 is relatively flat, smooth, free of irregularities and perpendicular to the centerline L of the pole piece 20. Such finishing operations include, but are not limited to, rapid stamping, impact or hydraulic coining, punching, flattening, smoothing, milling, grinding, lathing and burnishing. In addition to these processes, or alternatively, the contact surface 23 may be coated with a coating 21. For example only, the coating 21 may be a friction-enhancing coating (such as the products sold under the brand-name EKagrip® by ESK Ceramics GmbH & Co. KG (www.esk.com/en)) such that the coating 21 may have a coefficient of friction greater than the coefficient of friction of the contact surface 23 without a coating 21. Further, the contact surface 23 may define one or more depressions 25 that extend radially away from the annular inner side wall 24. These depressions 25 may be formed by stamping, coining, pressing or other machining process. During operation of the electromagnetic coil assembly 10, the depressions 25 may collect wear by-products and other contaminants (water, engine fluids, etc.) and channel them away from the contact surface 23.

The coil assembly 30 can be fixedly coupled to the channel structure of the pole piece 20. The coil assembly 30 may include a plurality of windings surrounding a core such that magnetic flux is generated when current is provided to the windings. The coil assembly 30 may also include a bonding material 32, e.g., to surround the plurality of windings and the core, and/or act as a contact surface 33 for armature plate 40 as described below. The combination of the pole piece 20 and coil assembly 30 may be referred to as an electromagnet. The coil assembly 30 may be fixedly coupled to the pole piece 20 between the annular inner and outer side walls 24, 26, for example, by the bonding material 32 or an adhesive, such as glue or epoxy. In some embodiments, the coil assembly 30 may be in contact the annular end wall 28 on the first axial end 27. On the second axial end 29 opposite the first axial end 27, there may be nothing between the coil assembly 30 and the open end of the pole piece 20 such that the coil assembly 30 is accessible and open. One or more wires or connectors (not shown) may be utilized to provide power to the coil assembly 30. The pole piece 20 may define one or more openings, e.g., in the annular inner side wall 24, annular outer side wall 26 or annular end wall 28, through which the wires and/or connectors pass such that power may be provided to the coil assembly 30.

The armature plate 40 may define a contact surface 43 configured to selectively contact the pole piece 20, e.g., contact surface 23 of flange member 22 or coil assembly 30, e.g., contact surface 33. In addition, or alternatively, to the depressions 25 on the contact surface 23, one or more depressions (similar to depressions 25) may be formed on a contact surface 43 of the armature plate 40 to collect wear by-products and other contaminants (water, engine fluids, etc.) and channel them away from the contact surface 43. The armature plate 40 may also include a friction material 45 that defines contact surface 43. The friction material 45 may be a coating formed on the main portion of the armature plate 40, or may be a separate member that is bonded or otherwise adhered to the main portion of the armature plate 40. In one non-limiting example, the friction material 45 may be a separately formed material (such as the products sold under the brand-name EKagrip® by ESK Ceramics GmbH & Co. KG (www.esk.com/en)) that is bonded to the main portion of the armature plate 40. Friction material 45 may be utilized to obtain the appropriate friction, durability and/or other properties for contact surface 43, while also allowing armature plate 40 to have the appropriate magnetic, strength, durability and/or other properties for efficient operation of the electromagnetic coil assembly 10.

Figure 8:
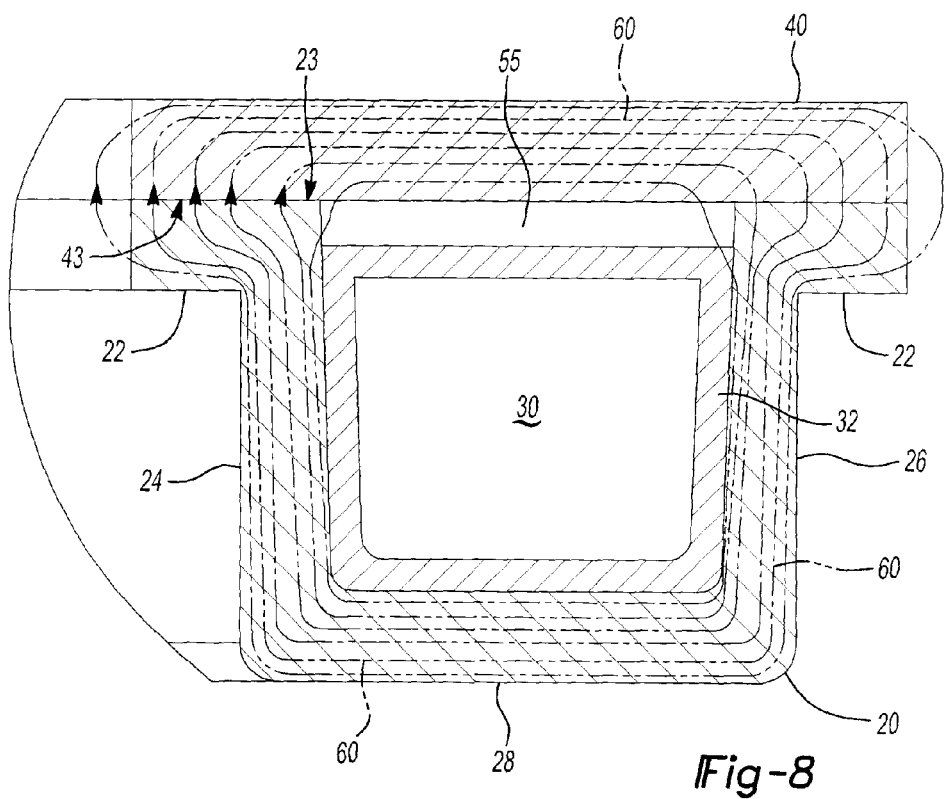
FIG. 8 is a partial sectional view of the exemplary electromagnetic coil assembly of FIG. 7 illustrating exemplary flux lines.
Figure 9:
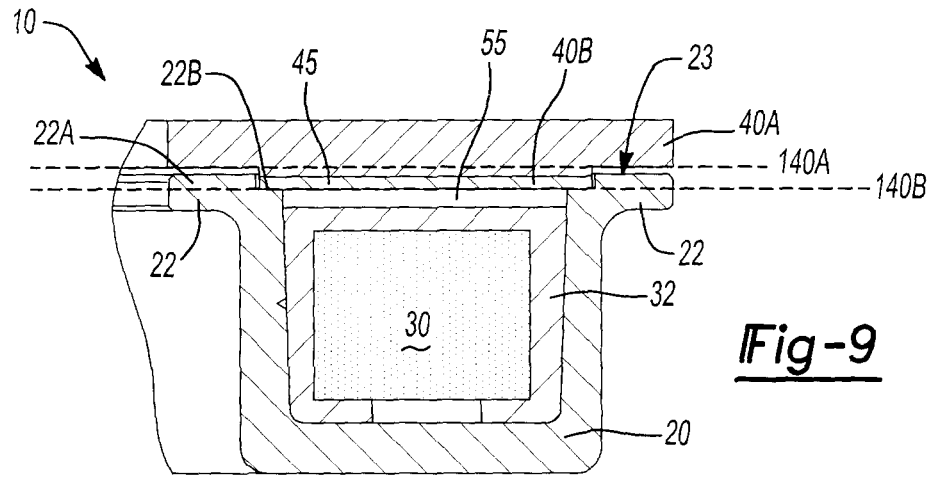
FIG. 9 is a partial sectional view of an exemplary electromagnetic coil assembly constructed in accordance with the teachings of the present disclosure.

As the electromagnetic coil assembly 10 is actuated, the armature plate 40 may be selectively coupled and decoupled with the pole piece 20. As illustrated in FIG. 8, which shows a portion of the exemplary pole piece 20 with two flange members 22 shown in FIG. 7, the coil assembly 30 may generate a plurality of flux lines 60 when energized. The flux lines 60 may travel through the pole piece 20, across gap 50 and through armature plate 40. The flux lines 60 can attract and move the armature plate 40 into contact with the pole piece 20. An empty cavity 55 may be defined by the pole piece 20, coil assembly 30 and armature plate 40 when the armature plate 40 is coupled with the pole piece 20. In this manner, the flux lines 60 may travel through the flange member(s) 22, and not across the empty cavity, to increase the attractive force between pole piece 20 and armature plate 40.

When the coil assembly 30 is energized, electromagnetic coil assembly 10 may enter a first configuration (FIG. 8) in which the contact surface 43 of the armature plate 40 contacts the pole piece 20, e.g., contact surface 23, the second portion 22B of the contact surface 23 (FIG. 9), and/or contact surface 33. The contact surface 43 may frictionally engage the contact surface 23 such that relative motion between the pole piece 20 and armature plate 40 is inhibited. When the coil assembly 30 is de-energized, electromagnetic coil assembly 10 may enter a second configuration (FIG. 1) in which the contact surface 43 of the armature plate 40 is separated from the pole piece 20, e.g., contact surface 23 and/or contact surface 33, by a gap 50. The gap 50 may permit relative motion between the pole piece 20 and armature plate 40. The electromagnetic coil assembly 10 may be biased to be in the second configuration by a biasing member, e.g., a spring (not shown). In a non-limiting example, the contact surface 43 may solely contact the contact surface 23 in the first configuration (see FIGS. 8-9) such that the pole piece 20, coil assembly 30 and armature plate 40 define empty cavity 55.

Figure 10:
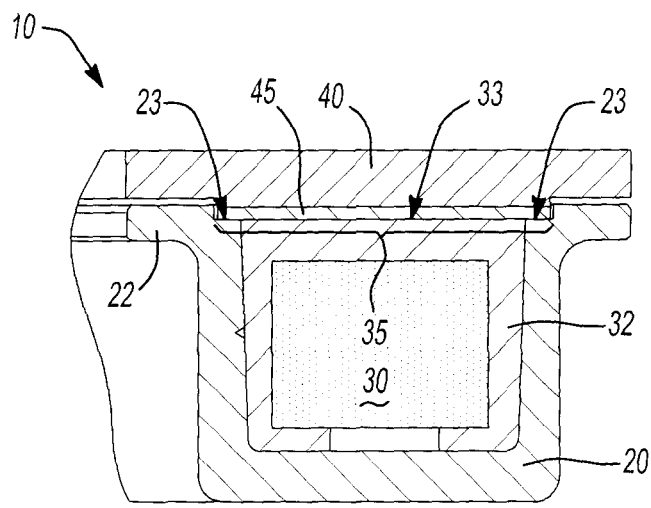
FIG. 10 is a partial sectional view of an exemplary electromagnetic coil assembly constructed in accordance with the teachings of the present disclosure.
Figure 11:
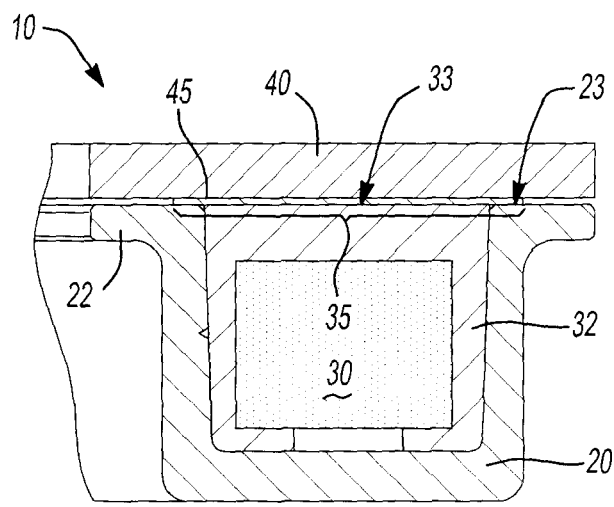
FIG. 11 is a partial sectional view of an exemplary electromagnetic coil assembly constructed in accordance with the teachings of the present disclosure.
Figure 12:
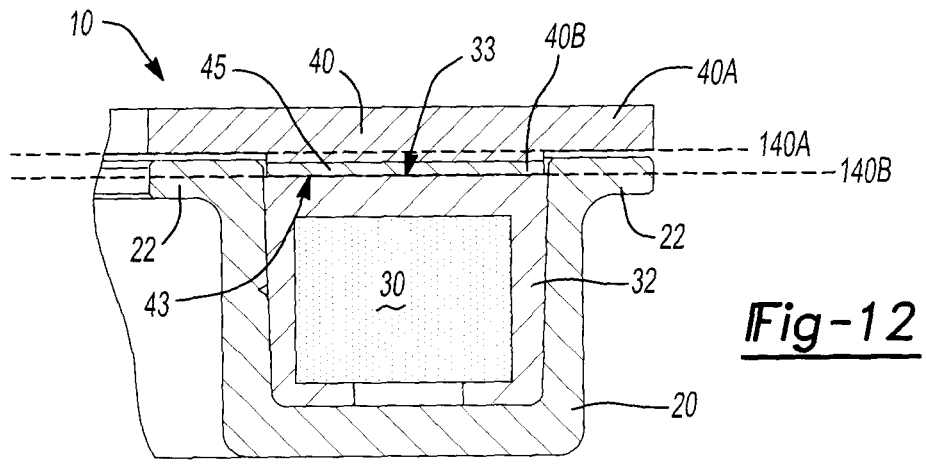
FIG. 12 is a partial sectional view of an exemplary electromagnetic coil assembly constructed in accordance with the teachings of the present disclosure.
Figure 13:
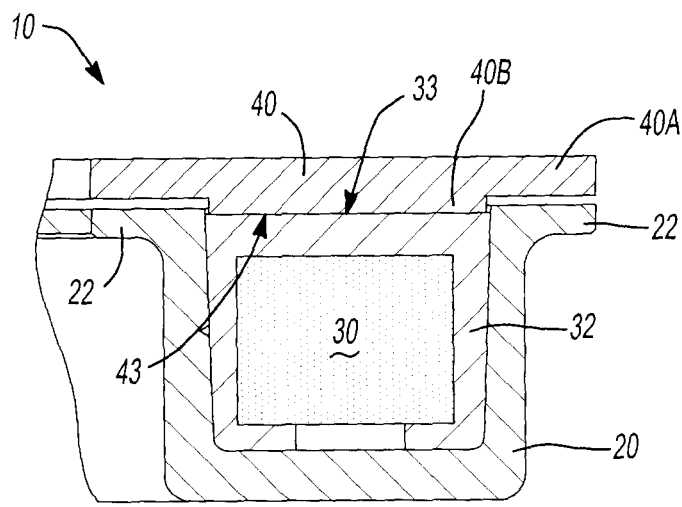
FIG. 13 is a partial sectional view of an exemplary electromagnetic coil assembly constructed in accordance with the teachings of the present disclosure.
Figure 14:
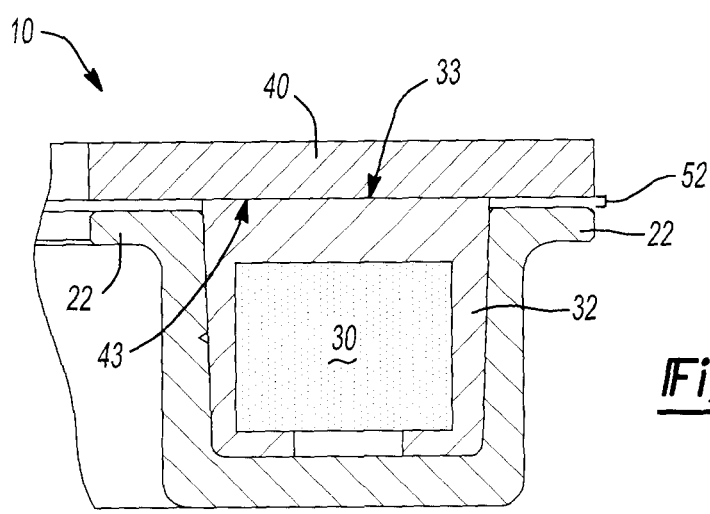
FIG. 14 is a partial sectional view of an exemplary electromagnetic coil assembly constructed in accordance with the teachings of the present disclosure.

In various embodiments of the present invention, the coil assembly 30 may include a contact or coil assembly surface 33 that frictionally engages the contact surface 43 of the armature plate 40 in the first configuration. In some embodiments, the coil assembly surface 33 may cooperate with the flange surface 23 to define a contact surface 35 that contacts the armature plate 40 in the first configuration (FIGS. 10-11). Alternatively, the coil assembly surface 33 may provide the sole contact surface between the pole piece 20 and coil assembly 30 in the first configuration (FIGS. 12-14). In various embodiments, the bonding material 32 may define the coil assembly/contact surface 33. As shown in FIGS. 10-12, the armature plate 40 may include friction material 45 to interact with and frictionally engage the contact surface(s) 23, 33, 35. Alternatively, as shown in FIGS. 13-14, the armature plate 40 may be monolithically formed and directly interact with and frictionally engage the contact surface(s) 23, 33, 35.

The bonding material 32 may be formed of a non-magnetic material, such as a polymer or ceramic material. For example only, the bonding material 32 may be a bulk molding compound, such as DIELECTRITE 48-50 BMC sold by IDI Composites International (www.idicomposites.com), that is injection molded into the pole piece 20. In various embodiments, the bonding material 32 may be a composite material engineered to obtain the performance characteristics desired for coil assembly surface 33. For example, the bonding material 32 may include a base material (such as a plastic resin) with one or more additives (such as carbon or other fibers or a ceramic material) to change the frictional and/or durability characteristics of the base material. In some embodiments, a metallic or magnetic material (such as steel or iron rods) may be added to the base material and arranged to tune the distribution of flux lines 60 of the combination of the pole piece 20 and coil assembly 30.

In various embodiments, as shown in FIGS. 9-13, the armature plate 40 may include a base portion 40A and an offset portion 40B. The base portion 40A may define a base plane 140A that extends in the radial direction of the pole piece 20. The offset portion 40B may define an offset plane 140B that extends in the radial direction of the pole piece 20. The offset plane 140B may be parallel and offset from base plane 140A. In this manner, the offset portion 40B may project from the face of the base portion 140B (as shown in FIGS. 9-13), or may be recessed within the base portion 140B (not shown). The offset portion 140B may also define the contact surface 33 such that a gap 52 exists between the flange member 22 and the armature plate 40 (or base portion of the armature plate 40) in the first configuration.

Figure 15:
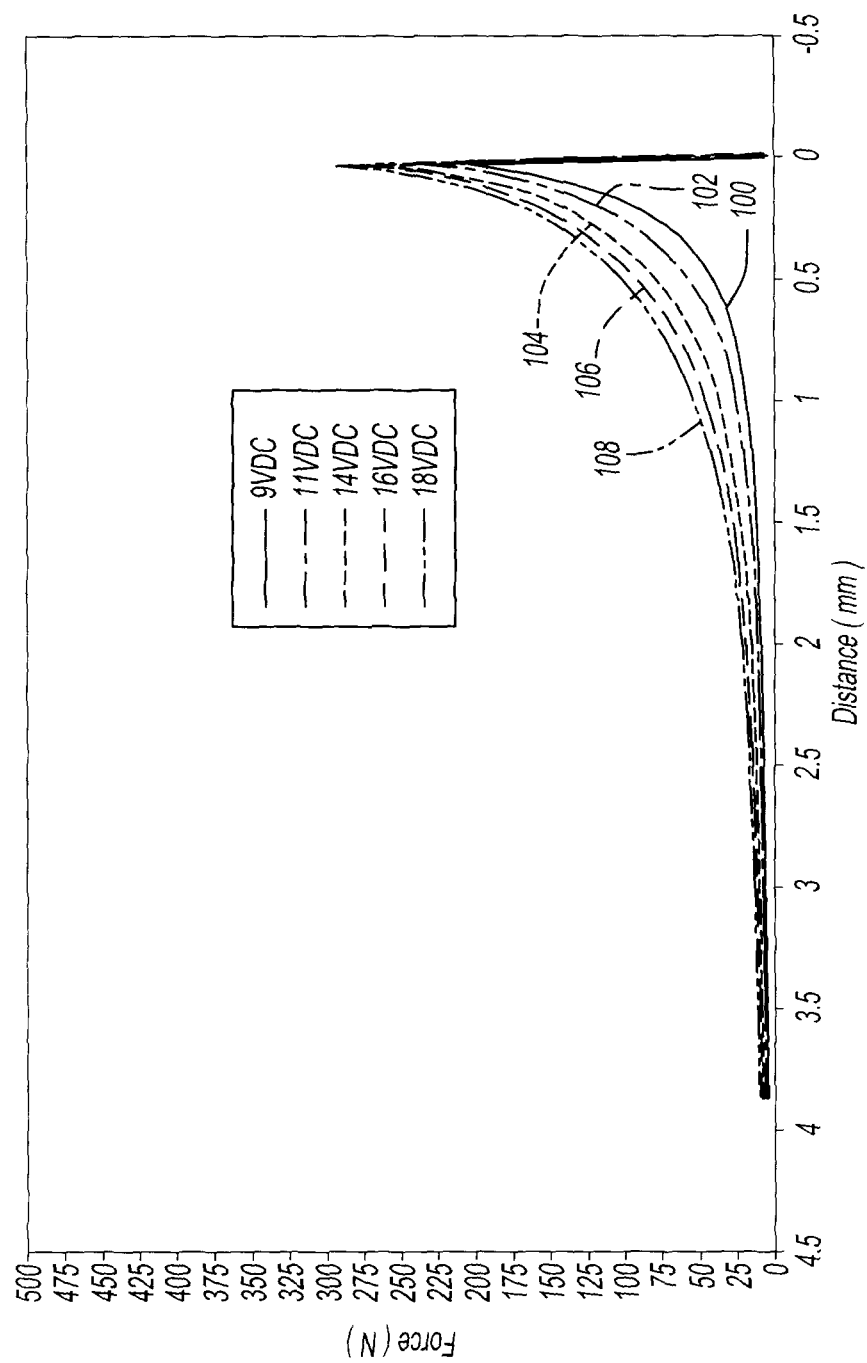
FIG. 15 is a graph illustrating the attractive force at a number of operating voltages between a pole piece and armature plate on the y-axis versus separating distance between the pole piece and armature plate on the x-axis for an electromagnetic coil assembly that does not include a flange member.

FIG. 15 is a graph illustrating the attractive force—at a number of operating voltages—between pole piece 20 and armature plate 40 (on the y-axis) versus distance between the contact surface 23 and the contact surface 33, 43 (on the x-axis) for an electromagnetic coil assembly that does not include a flange member. FIG. 16 is a similar graph for the electromagnetic coil assembly 10 of FIG. 10. Referring to FIG. 15 and the electromagnetic coil assembly without a flange member, curve 100 corresponds to an operating voltage of nine volts direct current, curve 102 corresponds to an operating voltage of eleven volts direct current, curve 104 corresponds to an operating voltage of fourteen volts direct current, curve 106 corresponds to an operating voltage of sixteen volts direct current, and curve 108 corresponds to an operating voltage of eighteen volts direct current. Similarly, referring to FIG. 16 and the electromagnetic coil assembly 10 of FIG. 10, curve 110 corresponds to an operating voltage of nine volts direct current, curve 112 corresponds to an operating voltage of eleven volts direct current, curve 114 corresponds to an operating voltage of fourteen volts direct current, curve 116 corresponds to an operating voltage of sixteen volts direct current, and curve 118 corresponds to an operating voltage of eighteen volts direct current. As can be seen by comparing these graphs, the attractive force between the pole piece 20 and armature plate 40 is higher for a given operating voltage for the electromagnetic coil assembly 10 of FIG. 10.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An electromagnet comprising:
a monolithically formed magnetically susceptible pole piece having a channel structure and a first flange member, the channel structure having an annular inner side wall, an annular outer side wall and an annular end wall that fixedly couples the inner and outer side walls to one another on a first axial end of the pole piece, the channel structure being open on a second axial end of the pole piece that is opposite the first axial end, the first flange member being coupled to an end of one of the inner and outer side walls on the second axial end, the first flange member having a first proximal end, which is directly coupled to the end of the one of the inner and outer side walls, and an opposite, first distal end that extends past the one of the inner and outer side walls in a radial direction such that the first flange member extends radially from the channel structure; and
a coil assembly fixedly coupled to the channel structure between the inner and outer side walls;
wherein the pole piece includes a second flange member, the second flange member having a second proximal end, which is directly coupled to an end of the other one of the inner and outer side walls on the second axial end, and an opposite, second distal end that extends past the other one of the inner and outer side walls in a radial direction such that the second flange member extends radially away from the channel structure.

2. The electromagnet of claim 1, wherein coil assembly extends outwardly from the second axial end of the pole piece.

3. The electromagnet of claim 1, wherein the first flange member defines a first flange surface, the second flange member defines a second flange surface and the coil assembly defines a coil assembly surface, the first and second flange surfaces and the coil assembly surface cooperating to define a contact surface that is flat within 0.25 millimeters and wherein runout of the contact surface relative to a centerline of the channel structure is within 0.25 millimeters.

4. The electromagnet of claim 1, wherein the first flange member defines a flange surface and the coil assembly defines a coil assembly surface, the flange surface and coil assembly surface cooperating to define a contact surface that is flat within 0.25 millimeters and wherein runout of the contact surface relative to a centerline of the channel structure is within 0.25 millimeters.

5. The electromagnet of claim 1, wherein the first flange member defines a contact surface that defines a plurality of depressions extending radially away from the annular inner side wall.

6. The electromagnet of claim 1, wherein the first flange member extends in a continuous and unbroken manner about the end of the one of the inner and outer side walls.

7. An electromagnetic coil assembly comprising:
a monolithically formed magnetically susceptible pole piece having a channel structure and a first flange member, the channel structure having an annular inner side wall, an annular outer side wall and an annular end wall that fixedly couples the inner and outer side walls to one another on a first axial end of the pole piece, the channel structure being open on a second axial end of the pole piece that is opposite the first axial end, the first flange member being coupled to an end of one of the inner and outer side walls on the second axial end, the first flange member having a first proximal end, which is directly coupled to the end of the one of the inner and outer side walls, and an opposite, first distal end that extends past the one of the inner and outer side walls in a radial direction such that the first flange member extends radially from the channel structure, the first flange member defining a first contact surface;
a coil assembly fixedly coupled to the channel structure between the inner and outer side walls; and
an armature plate defining a second contact surface, the first contact surface being in contact with the second contact surface in a first configuration when the coil assembly is energized so as to inhibit relative motion between the pole piece and armature plate, the first contact surface being separated from the second contact surface by a gap in a second configuration when the coil assembly is de-energized so as to allow relative motion between the pole piece and armature plate;
wherein the pole piece further includes a second flange member having a second proximal end, which is directly coupled to an end of the other one of the inner and outer side walls on the second axial end, and an opposite, second distal end that extends past the other one of the inner and outer side walls in a radial direction such that the second flange member extends radially away from the channel structure, the second flange member defining a third contact surface that is in contact with the second contact surface in the first configuration and is separated from the second contact surface in the second configuration.

8. The electromagnetic coil assembly of claim 7, wherein the first contact surface defines a plurality of depressions extending radially away from the annular inner side wall.

9. The electromagnetic coil assembly of claim 7, wherein the armature plate includes a friction material that defines the second contact surface.

10. The electromagnetic coil assembly of claim 9, wherein the armature plate, pole plate and coil assembly define an empty cavity in the first configuration.

11. The electromagnetic coil assembly of claim 9, wherein the coil assembly defines a third contact surface that is in contact with the second contact surface in the first configuration.

12. The electromagnetic coil assembly of claim 11, wherein the pole piece includes a second flange member that is coupled to an end of the other one of the inner and outer side walls on the second axial end, the second flange member extending radially from the channel structure and defining a fourth contact surface that is in contact with the second contact surface in the first configuration and is separated from the second contact surface in the second configuration.

13. The electromagnetic coil assembly of claim 7, wherein the first flange member extends in a continuous and unbroken manner about the end of the one of the inner and outer side walls.

14. An electromagnetic coil assembly comprising:
a monolithically formed magnetically susceptible pole piece having a channel structure, a first flange member, and a second flange member, the channel structure having an annular inner side wall, an annular outer side wall and an annular end wall that fixedly couples the inner and outer side walls to one another on a first axial end of the pole piece, the channel structure being open on a second axial end of the pole piece that is opposite the first axial end, the first flange member being coupled to an end of one of the inner and outer side walls on the second axial end, the first flange member having a first proximal end, which is directly coupled to the end of the one of the inner and outer side walls, and an opposite, first distal end that extends past the one of the inner and outer side walls in a radial direction such that the first flange member extends radially from the channel structure, the second flange member having a second proximal end, which is directly is coupled to an end of the other one of the inner and outer side walls on the second axial end, and an opposite, second distal end that extends past the other one of the inner and outer side walls in a radial direction such that the second flange member extends radially away from the channel structure;
a coil assembly fixedly coupled to the channel structure between the inner and outer side walls and defining a first contact surface; and
an armature plate defining a second contact surface, the first contact surface being in contact with the second contact surface in a first configuration when the coil assembly is energized so as to inhibit relative motion between the pole piece and armature plate, the first contact surface being separated from the second contact surface by a first gap in a second configuration when the coil assembly is de-energized so as to allow relative motion between the pole piece and armature plate.

15. The electromagnetic coil assembly of claim 14, wherein the coil assembly includes a bonding material that defines the first contact surface.

16. The electromagnetic coil assembly of claim 14, wherein the armature plate includes a friction material that defines the second contact surface.

17. The electromagnetic coil assembly of claim 14, wherein the pole piece includes a second flange member that is coupled to an end of the other one of the inner and outer side walls on the second axial end, the second flange member extending radially from the channel structure.

18. The electromagnetic coil assembly of claim 14, wherein the armature plate includes a base portion defining a base plane extending in a radial direction of the pole piece and an offset portion defining an offset plane that is parallel to and offset from the base plane, the offset portion defining the second contact surface.

19. The electromagnetic coil assembly of claim 14, wherein the coil assembly extends outwardly from the second axial end of the pole piece such that there is a second gap between the first flange member and the armature plate in the first configuration.

20. The electromagnetic coil assembly of claim 14, wherein the first flange member extends in a continuous and unbroken manner about the end of the one of the inner and outer side walls.

\* \* \* \* \*